Oct. 21, 1952  H. W. PATNODE ET AL  2,614,976
ELECTRODE FOR DETERMINING CATIONIC ACTIVITY
Original Filed Feb. 11, 1949
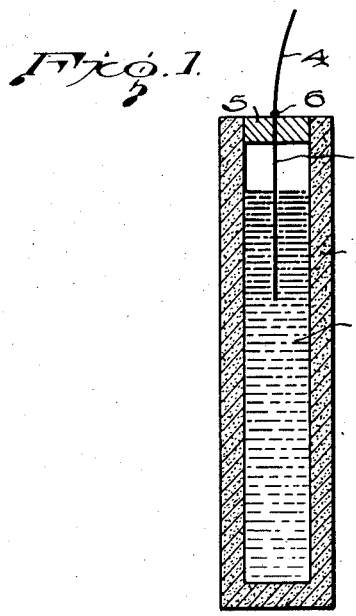
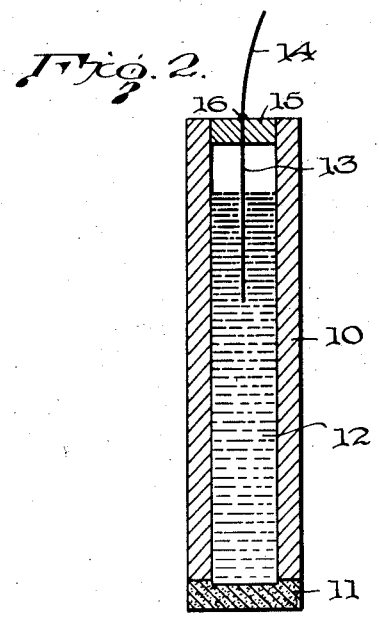
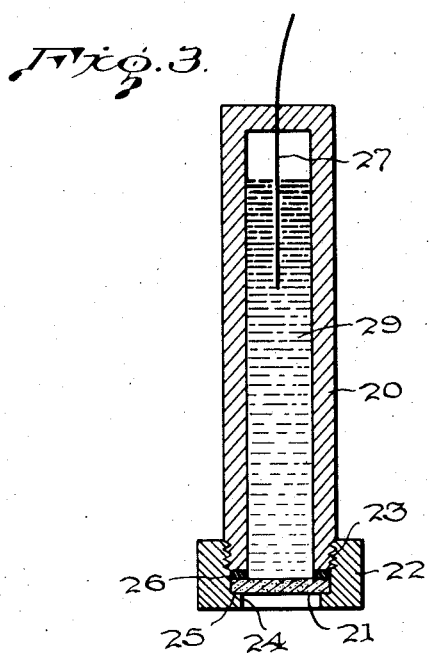
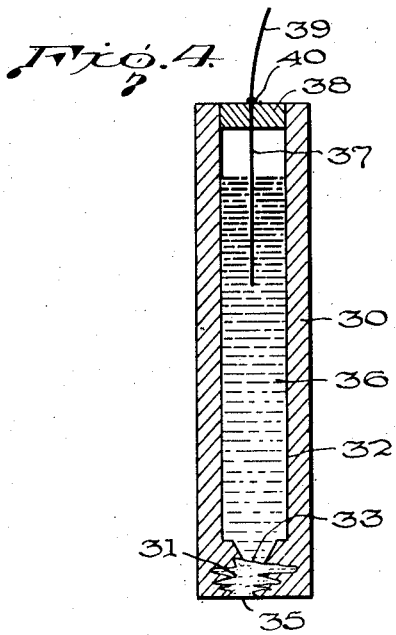
INVENTORS
HOMER W. PATNODE
MALCOLM R. J. WYLLIE
BY
THEIR ATTORNEY Patented Oct. 21, 1952

2,614,976

UNITED STATES PATENT OFFICE 2,614,976

ELECTRODE FOR DETERMINING CATIONIC ACTIVITY

Homer W. Patnode, Hampton Township, Allegheny County, and Malcolm R. J. Wyllie, Indiana Township, Allegheny County, Pa., assignors to Gulf Research & Development Company, Pittsburgh, Pa., a corporation of Delaware Continuation of applications Serial No. 75,924, February 11, 1949, and Serial No. 95,814, May 27, 1949. This application October 19, 1951, Serial No. 252,146

15 Claims. (Cl. 204—195)

This invention concerns apparatus for making measurements of the cationic activity of electrolytes and more particularly concerns an apparatus assembly and method of making the same which is useful as an electrode for measuring the cation concentration in electrolytes.

The well-known glass electrode has been used for the measurement of E. M. F.'s from which comparative hydrogen-ion activity or hydrogen-ion concentration in electrolytes may be determined. Attempts have been made to use materials, such as glasses of various composition, for the measurements of the activity of ions other than hydrogen. This invention is based on the fact that certain compounds which have charged latices neutralized by exchangeable cations, such as for example natural hydrated zeolites, may be used as electrode membranes for the determination of cation activity. We have found that ordinary shales may serve as membranes for determining cationic activities, particularly when such a shale membrane is very thick. Such a membrane-type electrode is useful in making chemical analyses, biochemical measurements, physiological measurements, and other applications.

It is an object of this invention to provide a membrane-type electrode which is useful for the measurement of cationic activity in electrolytes.

Another object of this invention is to provide an electrode for measuring cationic activity in which the membrane comprises a material having exchangeable ions.

Another object of this invention is to provide an electrode for measuring cationic activity in which the membrane comprises a mixture of a synthetic cationic-exchange material and an inert insulating bonding resin.

Another object of this invention is to provide an improved electrode for measuring cationic activity in which the membrane comprises a finely-divided material having exchangeable ions, said material being held in place by dissemination within a matrix of inert insulating bonding material.

Another object of this invention is to provide an improved electrode for measuring cationic activity in which a low electrical resistance and high speed of response is attained in the membrane by a construction comprising the dissemination within a matrix of inert insulating bonding material of a large fraction of material having exchangeable ions.

Reference may be made to the accompanying drawing forming part of this specification and in which:

Figure 1 shows an embodiment of the invention in which an inert insulating material containing an artificial cationic-exchange material is used as a membrane in a half-cell;

Figure 2 shows an embodiment of the invention in which an impervious inert insulating tube is closed at one end by a membrane comprising an inert insulating material having disseminated therein powdered cationic-exchange material;

Figure 3 shows an embodiment of the invention in which the closure for the lower end of an impervious inert insulating tube comprises a disc containing powdered cationic-exchange material;

Figure 4 shows an electrode assembly which employs as the membrane a natural shale fragment or an irregular mass of an insulating material having disseminated therein a substantial portion of synthetic cationic-exchange material.

An electrode assembly may be arranged in the form of a half-cell in which the wall or a portion of a wall of a container acts as a cationic-exchange membrane and the interior of the cell is filled with an electrolyte such as aqueous sodium chloride solution to which a nonpolarizable external electrical connection is made. The container or half-cell may then be immersed in the electrolyte whose cationic activity is to be determined and the electric circuit completed through an appropriate potentiometric measuring device to a standard electrode also immersed in the external electrolyte. Such an electric circuit arrangement for the measurement of ionic concentration is well known in the art.

Difficulties are encountered with half-cells of this type in that the electrical resistance of the membrane may be quite high so that an electronic amplifier must be used to measure the D.-C. voltage developed. Furthermore, the speed of response is often slow, i. e., the cell is slow to reach equilibrium with the external electrolyte whose cationic activity is being determined, thus requiring excessive time of the operator in making the measurement. Primary advantages of our invention are that low electrical resistance of the membrane is obtained resulting in the elimination of the electronic amplifier whereby the cell potential may be measured with an ordinary potentiometer. Furthermore, the speed of response is increased thereby resulting in a considerable saving of the operator's time.

Referring to Figure 1 the half-cell may be made in the form of a container 1 whose composition will be described later, the bottom portion of the container being formed integral therewith. Figure 1 shows the container in the form of a tube but this is not a limiting shape. The tube or container contains an electrolyte which may conveniently be an aqueous sodium chloride solution 2, into which there is immersed a nonpolarizable electrode such as a silver wire 3 which is coated with silver chloride (not shown). The silver wire 3 is conveniently held in place by means of a top closure 5 made of insulating material and through which the wire 3 extends. An external lead wire 4 may be connected to the silver wire as at 6 by soldering or other means. Alternatively electrical connection to the sodium chloride or other suitable solution may be made by means of a saturated potassium chloride bridge or other similar well-known method of reducing boundary potentials. These bridges may then be connected to any suitable standard half-cell such as a saturated calomel electrode, etc.

In Figure 1 the tube 1 itself comprises the membrane of the half-cell. It is prepared by mixing a quantity of finely-powdered material having exchangeable ions together with a quantity of chemically inert and electrically insulating powdered or granular resin (plastic) and molding this mixture into a form of suitable size and shape by the appropriate use of heat and pressure or both. The material having exchangeable ions may be clay, shale, natural zeolites or it may comprise synthetic cationic exchangers which function in the same manner as the natural materials. We have found that Na-montmorillonite is a satisfactory natural cationic-exchange material. Besides the natural zeolites, one may use synthetic zeolites, also greensands (glauconite), hydromicas, clays (including the montmorillonite group, the hydrous micas, the kaolinite group and other clays), shales, carbonaceous exchangers (sulfonated lignins, etc.) and resin exchangers. Synthetic cationic-exchange resins may be used, for example those of the phenol-formaldehyde type. Commercial synthetic cation exchangers have been found suitable. The finely-powdered synthetic resin (plastic) may be of the thermoplastic or thermosetting type such as methyl methacrylate or may be of the polymerizing type such as the phenolic resins, or any other of a variety of moldable plastics of a similar nature which are both chemically inert and electrically insulating. The finely-powdered cationic-exchange material, such as powdered clay or shale or cationic-exchange resin, is uniformly mixed with the finely-powdered plastic before molding. A preferred mixture is one which comprises from 5 per cent to 30 per cent by weight of cationic-exchange material. When clay is used a mixture of about 10 per cent by weight of clay is preferred and when, for example, a synthetic cation exchanger is used, 25 per cent by weight of the air-dried material is preferred. It is preferred to grind the synthetic resin cation exchanger and the methyl methacrylate bonding resin to pass U. S. Sieve Series Numbers 120 and 80, respectively, and then mix the materials together by further light grinding in a mortar or its industrial equivalent. The above composition percentages and grinding specifications are given by way of illustration only and are not to be considered restrictive.

We have found that by using resinous cationic-exchange materials of a particular type together with the synthetic resin polystyrene, superior properties are obtained in that a much lower electrode resistance is obtained as well as one having a greater speed of response. Cation-exchange resins that meet the requirements of our invention are the sulfonated phenolic formaldehyde resins and particularly the sulfonated polyhydric phenol formaldehyde resins.

It is preferred to intimately mix the cation-exchange resin and polystyrene by grinding them separately to pass 250 mesh screen and then mixing the materials together by further light grinding in a mortar or its industrial equivalent. After intimate mixing the composition is molded under 1000 p. s. i. to 120° C., then under 5,200 p. s. i. to 205° C., and thereafter allowed to cool slowly in the mold. While we prefer a membrane composed of 70 per cent by weight of cation-exchange resin, satisfactory membranes may be made with compositions in the range from 50 per cent to 80 per cent of other sulfonated phenolic formaldehyde resins and with 50 per cent to 20 per cent polystyrene. We have found that 70 per cent cation-exchange resin is an optimum in that it combines good electrochemical properties in the membrane with an electrical resistance of the order of 1000 ohms for a one inch diameter disc. The latter resistance is sufficiently low to enable an ordinary potentiometer to be used for the potential measurements, thus eliminating the thermionic amplifier from the potential-measuring circuit. Due also to the large percentage of active cationic-exchange material in the membrane of our preferred composition the speed of response of the electrode is very materially increased.

The ion-exchange-material-plastic composition may be molded in the form of a closed tube as shown in Figure 1 or in the form of a solid rod whose center is afterwards drilled out to form a tube-like structure. The wall thickness may vary over wide limits. A thicker wall increases the time necessary for the composition and hence the electrode emf to reach equilibrium with the ions whose activity is being measured. We have found that a thickness of about 4 mm. is preferred.

In the embodiment of Figure 2 the tube 10 comprises an impervious insulating material which may conveniently be of an inert insulating plastic, the bottom opening of the tube being closed by a plate or button 11 comprising a powdered cationic-exchange material and a synthetic bonding resin similar to that used in the structure of tube 1 of Figure 1.

The membrane material is molded into the form of a disc which is afterwards cemented to the tube 10 through the agency of a suitable water-resistant insulating adhesive, such for example as optical pitch containing a small amount of mineral oil. The interior of the container thus formed may contain aqueous sodium chloride solution 12 into which dips a silver wire 13 which is coated with silver chloride (not shown) and held in place by the closure plug 15. An external lead wire 14 may be connected to the silver wire as at 16 by soldering or other means. The form of the half-cell shown in Figure 2 has a higher internal resistance than that of Figure 1 due to the smaller area of contact with the external electrolyte, but we have found that a one inch diameter disc about 4 millimeters thick exhibits an electrical resistance of about 1000 ohms.

The embodiment shown in Figure 3 is similar to that of Figure 2 except that the disc 21 forming the bottom closure of the tube 20 is held in place by means of a collar 22 which is screw threaded onto tube 20 as at 23. The collar 22 has an opening 24 and has a shoulder as at 25 which serves to hold the disc of cationic-exchange material against the bottom of tube 20. Between the disc 21 and tube 20 there may be placed a relatively soft annular insulating gasket 26 made of a deformable material such as rubber. A similar annular gasket (not shown) may also be used between the disc 21 and the shoulder 25 of collar 22 in order to prevent mechanical damage to the disc when tightening the collar 22 onto the tube 20. The tube 20 may be of an inert insulating material having its upper end closed and having molded therein or otherwise supporting a silver wire 27. The wire 27 is coated with silver chloride (not shown) and dips into the internal electrolyte 29 which may be an aqueous sodium chloride solution. The embodiment of the half-cell shown in Figure 3 is advantageous in that the disc 21 which comprises the cationic-exchange membrane may be conveniently and easily replaced should it become broken or otherwise inoperative.

In another embodiment of a half-cell shown in Figure 4 a tube or rod (although these are not limiting shapes) of inert plastic insulating material 30 is molded in such manner that it has embedded at one end a fragment of natural shale rock 31. After the molding operation a hole 32 is drilled down the center of the rod from the end opposite from the shale fragment. This hole is drilled so as to expose at its bottom the piece of shale as at 33. The other end of the rod may be cut off so that a portion of the shale fragment is exposed as at 35. The hole 32 may then contain an electrolyte such as aqueous sodium chloride solution 36 and a silver wire 37 coated with silver chloride (not shown) dipped into it, the wire 37 being held in place by the closure plug 38. An external lead wire 39 may be connected to the wire 37 as by soldering or other means indicated at 40.

In any of the embodiments shown in Figures 1, 2, and 3, the composition of cationic-exchange material and bonding resin may comprise either a natural or a synthetic cationic exchanger. Thus in making the container 1 of Figure 1, the bottom closure 11 of Figure 2, or 21 of Figure 3, a synthetic cationic exchanger may be substituted for the natural material generally referred to as clay. In Figure 4 the fragment of shale may comprise the composition of cationic exchanger (either natural or synthetic) and plastic previously mentioned.

While we have indicated that a membrane made of 70 per cent cation-exchange resin and 30 per cent polystyrene is to be preferred, we have found that active membranes may be made by using slightly larger percentage of cation-exchange resin with correspondingly less polystyrene. However, we have found that by increasing the percentage of cation-exchange resin beyond 70 per cent the mechanical properties of the membrane become inferior. Such mechanically-inferior compositions may, however, be successfully employed by using the embodiment of the half-cell shown in Figure 4 in which a tube or rod (although these are not limiting shapes) of inert plastic insulating material 30 is molded in such manner that it has embedded in one end a fragment or irregular mass of the cation-exchange resin-polystyrene composition, the fragment being indicated by 31 in Figure 4. After the molding operation a hole 32 is drilled down the center of the rod from the end opposite from the active mass. This hole is drilled so as to expose at its bottom the active mass as at 33. The other end of the rod may be cut off so that a portion of the active mass is exposed as at 35. The hole 32 may then contain an electrolyte such as aqueous sodium chloride solution 36 and a silver wire 37 coated with silver chloride (not shown) dipping into it, the wire 37 being held in place by a closure plug 38. An external lead wire 39 may be connected to the wire 37 as by soldering or other means indicated at 40.

In any of the embodiments shown, the electrolyte of the half-cell may comprise an aqueous sodium chloride solution of known concentration, preferably a saturated solution. By measuring the emf developed when an electrode of this invention is immersed in an aqueous sodium chloride solution of known cationic activity and comparing this emf with the emf measured when the electrode is immersed in an unknown electrolyte containing sodium ions, the effective cationic activity of the unknown electrolyte may be calculated by applying the well-known Nernst equation, viz.

$$E=\frac{RT}{nF}\ln\frac{a_1}{a_2}$$

where:

$E$ = E. M. F. measured in volts
$R$ = gas constant (joules per mole)
$T$ = absolute temperature
$F$ = Faraday's constant ($96494 \pm 10$ coulombs/gram equivalent)
$a_1$ = Activity of known cationic activity
$a_2$ = Effective activity of unknown cationic activity
$n$ = Valence of cation, e. g., unity of sodium, two for calcium.

The electrode assembly of this invention may be made with great uniformity and permits reliable measurement of relative cationic activities. The composition of the material carrying the active cationic-exchange agent may be accurately controlled thereby eliminating errors or variations of measurement due to inhomogeneity of chemical composition and mechanical weakness such as often occur in portions of natural shale.

It is also possible in the electrode construction of this invention to employ materials having different exchangeable ions for specific applications. Thus the membrane may be made with sodium as the exchange ion, such being useful for certain applications resulting in the determination of the sodium ion activity, or the membrane may be made with calcium as the exchangeable ion if desired, by the inclusion in the plastic of the appropriate type of cationic exchanger. The electrolyte used in the half-cell should correspond to the exchangeable ion of the cationic-exchange material employed if the activity of that ion is to be determined. Thus instead of using aqueous sodium chloride solution in the half-cell, an electrolyte having calcium ions is used with a calcium exchange material for the determination of calcium-ion activity.

In order to test the electrode of our invention, numerous ones have been made and the emf's measured therewith have been compared with those of a glass electrode in the measurement of pH in HCl solutions. In making this comparison the emf values observed with our electrode have been compared with the difference between the potentials measured first in one HCl solution and then in the other with a glass electrode and saturated calomel reference electrode. The measurement circuit in making the above comparisons was a potentiometer and thermionic amplifier. Table I shows the results of such a comparison with a glass electrode and also shows the agreement between emf's measured with a number of electrodes made according to our invention:

TABLE I

*Potentials obtained at 22° C. using bonded synthetic cation exchanger and methyl methacrylate plastic and hydrochloric acid solutions of pH approximately 0.0 and 1.1*

| Electrode Number | Composition of Membrane | Thickness of Membrane (mm.) | Mean E. M. F. Observed (±0.1 m. v.) (m. v.) | E. M. F. Observed with Glass Electrode (m. v.) |
|---|---|---|---|---|
| H 1 | H-synthetic cation exchanger / Plastic | 2.0 | 65.3 | 64.3 |
| H 2 | do | 2.0 | 65.4 | 64.3 |
| H 3 | do | 2.0 | 63.9 | 64.3 |
| Na 4 | Na-synthetic cation exchanger / Plastic | 3.5 | 65.4 | 64.3 |
| Na 5 | do | 2.5 | 65.4 | 64.3 |
| Na 6 | do | 3.0 | 64.7 | 64.3 |

The above comparisons show that the potentials observed when using an electrode of our invention in a solution containing hydrogen ions are similar to that of a glass electrode.

In addition to the above test, the potentials observed with an electrode of our invention have been compared with those computed by the well-known Nernst equation, the activities of the sodium ions being computed from the known mean activities of sodium chloride solutions at the appropriate concentrations on the assumption that the activities of the chloride ions are the same as that of the chloride ion in solutions of potassium chloride of the same ionic strength as the sodium chloride solutions. It is further assumed that the activities of the potassium and chloride ions in potassium chloride solutions are equal and are thus calculable from the known means activities of the appropriate potassium chloride solutions. It was found that the observed potentials follow closely those predicted by this equation. The following table shows the results of such a comparison with theoretical computations:

TABLE II

*Potentials obtained at 22° C. using bonded synthetic cation exchanger and methyl methacrylate plastic resin membranes separating NaCl solutions.*

| Electrode Number | Composition of Membrane | Thickness of Membrane (mm.) | 1.000 m. NaCl vs. 0.1094 m. NaCl | |
|---|---|---|---|---|
| | | | Mean E. M. F. Observed (±0.1 m. v.) (m. v.) | Theoretical E. M. F. (m. v.) |
| Na 1 | Na-synthetic cation exchanger / Plastic | 4.0 | 52.4 | 53.8 |
| Na 2 | do | 3.0 | 53.3 | 53.8 |
| Na 3 | do | 3.0 | 52.5 | 53.8 |
| H 4 | H-synthetic cation exchanger / Plastic | 2.0 | 50.5 | 53.8 |
| H 5 | do | 2.5 | 56.1 | 53.8 |
| H 6 | do | 2.0 | 50.7 | 53.8 |

TABLE III

*Potentials obtained at 22° C. with bonded synthetic cation exchanger and methyl methacrylate plastic resin membranes separating NaCl solutions.*

| Electrode Number | Composition of Membrane | Thickness of Membrane (mm.) | 3.00 m. NaCl vs. 0.462 m. NaCl | |
|---|---|---|---|---|
| | | | Mean E. M. F. Observed (±0.1 m. v.) (m. v.) | Theoretical E. M. F. (m. v.) |
| Na 20 | Na-synthetic cation exchanger / Plastic | 1.3 | 54.1 | 54.1 |
| Na 21 | do | 2.3 | 53.5 | 54.1 |
| Na 22 | do | 1.9 | 53.7 | 54.1 |
| Na 23 | do | 1.8 | 52.6 | 54.1 |
| Na 24 | do | 2.6 | 53.4 | 54.1 |
| Na 25 | do | 3.5 | 53.7 | 54.1 |

The above comparisons indicate that the electrode of our invention has high electro-chemical efficiency. The potentials observed by using our electrode have been found reproducible to a high degree as shown by the results indicated in the above tables. The largest errors are obtained when using a H-synthetic cation exchanger composition membrane (H4, H5, H6) for measuring potentials in the NaCl solution. Substantially higher accuracy is obtained when the type of synthetic cation exchanger used in the membrane corresponds to the ion in solution. Furthermore, the potentials observed using our electrode agree substantially with those computed and also with those measured with a glass electrode for the simple case of pH measurement. The tables indicate that reproducibility of better than 2 per cent in potential is obtainable using the electrode of our invention and that the measured potential is independent to within this accuracy of variations in membrane thickness, variations in membrane resistance and variations in percentage composition.

The E. M. F.'s measured with electrodes of our invention employing polystyrene as the plastic have been compared with those computed by the well-known Nernst equation, the activities of the sodium ions being computed from the known mean activities of sodium chloride solutions at the appropriate concentrations on the assumption that the activities of the chloride ions are the same as that of the chloride ion in solutions of potassium chloride of the same ionic strength as the sodium chloride solutions. It is further assumed that the activities of the potassium and chloride ions in potassium chloride solutions are equal and are thus calculable from the known mean activities of the appropriate potassium chloride solutions. It was found that the observed potentials follow closely those predicted by this equation. The accompanying Tables V and VI show the results of such a comparison with theoretically computed emf's. The physical characteristics of the particular electrodes used are given in Table IV. The sodium ion exchange resin referred to in Tables IV, V, and VI was the sodium form of a sulfonated phenolic formaldehyde resin.

TABLE IV

*Physical characteristics of some electrodes made from bonded Na-exchange resin ground to less than 200 mesh and polystyrene resin membranes separating NaCl solutions*

| Electrode Number | Composition of Membrane, Weight Percentages of Na-Exchange resin | Thickness of Membrane (mm.) | Total Resistance of Membrane, ohms |
| --- | --- | --- | --- |
| A | 50 | 0.5 | 1,200,000 |
| B | 60 | 1.1 | 230,000 |
| C | 60 | 1.2 | 220,000 |
| D | 70 | 1.3 | 3,600 |
| E | 70 | 1.6 | 6,000 |
| F | 70 | 4.2 | 1,340 |
| G | 70 | 1.8 | 5,600 |

An accuracy of better than 3 per cent in potential is indicated when compared with theoretical computations. However, the tables show an even higher degree of reproducibility and it is the latter criterion which is of practical importance.

The tables also show that electrode resistance may vary over a wide range with substantially no effect on the potentials measured with our electrode. Furthermore, the tables show that variations in membrane thickness are of substantially no influence on the measured E. M. F.'s and also that limited variations in composition have substantially no influence on the measured E. M. F.'s.

TABLE V

*Potentials obtained at 22° C. with bonded Na-exchange resin and polystyrene resin membranes separating NaCl solution*

| Electrode Number | 4.000 m. NaCl and 0.700 m. NaCl | | 2.000 m. NaCl and 0.250 m. NaCl | |
| --- | --- | --- | --- | --- |
| | Mean E. M. F. Observed (±0.1 m. v.) (m. v.) | Theoretical E. M. F. (m. v.) | Mean E. M. F. Observed (±0.1 m. v.) (m. v.) | Theoretical E. M. F. (m. v.) |
| A | 51.8 | 54.8 | 53.7 | 53.1 |
| B | 51.7 | 54.8 | 53.7 | 53.1 |
| C | 52.4 | 54.8 | 53.8 | 53.1 |
| D | 53.2 | 54.8 | 53.3 | 53.1 |
| E | 53.0 | 54.8 | 54.0 | 53.1 |
| F | 53.3 | 54.8 | 53.3 | 53.1 |
| G | 53.5 | 54.8 | 55.0 | 53.1 |

TABLE VI

*Potentials obtained at 22° C. with bonded Na-exchange resin and polystyrene resin membranes separating NaCl solutions*

| Electrode Number | 1.000 m. NaCl and 0.107 m. NaCl | | 0.100 m. NaCl and 0.010 m. NaCl | |
| --- | --- | --- | --- | --- |
| | Mean E. M. F. Observed (±0.1 m. v.) (m. v.) | Theoretical E. M. F. (m. v.) | Mean E. M. F. Observed (m. v.) | Theoretical E. M. F. (m. v.) |
| A | 59.2 | 58.2 | 54.5 | 55.0 |
| B | 58.8 | 58.2 | 55.5 | 55.0 |
| C | 59.3 | 58.2 | 56.0 | 55.0 |
| D | 58.5 | 58.2 | 55.8 | 55.0 |
| E | 58.9 | 58.2 | 55.6 | 55.0 |
| F | 59.0 | 58.2 | 55.1 | 55.0 |
| G | 60.3 | 58.2 | 55.2 | 55.0 |

As previously pointed out, the electrode membrane as constructed according to our invention may be made with relatively low electrical resistance (as illustrated by the electrode designated in the tables as D, E, F, G), thus permitting rapid measurements to be made with an ordinary potentiometer and without the use of an electronic amplifier.

This application is a continuation of our co-pending, co-assigned application Serial No. 75,924, filed February 11, 1949, entitled Electrode for determining cationic activity (now abandoned) and of our copending, co-assigned application Serial No. 95,814, filed May 27, 1949, entitled Electrode for determining cationic activity (now abandoned).

What we claim as our invention is:

1. A method of making an electrode which comprises preparing a composition by intimately mixing a finely-divided cationic-exchange material with a chemically-inert electrically-insulating moldable bonding resin, molding said composition so as to form at least a part of the wall of a container, placing inside said container and in contact with said composition an electrolyte of desired cationic activity, and immersing an electrical connecting element in said contained electrolyte.

2. An electrode comprising a membrane of a chemically-inert electrically-insulating moldable plastic carrying uniformly disseminated throughout the body thereof from 5 per cent to 30 per cent of a finely-divided cationic-exchange material, said membrane forming at least a part of the wall of an inert insulating container, an electrolyte in said container and in contact with said membrane, and means for electrically contacting said electrolyte.

3. An electrode comprising a membrane of a chemically-inert electrically-insulating plastic having uniformly disseminated throughout the body thereof a finely-divided synthetic cationic-exchange material, said membrane forming at least a part of the wall of an inert insulating container, an electrolyte in said container and in contact with said membrane, and means for electrically contacting said electrolyte.

4. An electrode comprising a membrane of a chemically-inert electrically-insulating plastic having uniformly disseminated throughout the body thereof from 5 per cent to 30 per cent of a finely-divided phenol-formaldehyde cationic-exchange material, said membrane forming at least a part of the wall of an inert insulating container, an electrolyte in said container and in contact with said membrane, and means for electrically contacting said electrolyte.

5. An electrode comprising a membrane of methyl-methacrylate having uniformly disseminated throughout the body thereof from 5 per cent to 30 per cent of a finely-divided phenol-formaldehyde cationic-exchange material, said membrane forming at least a part of the wall of an inert insulating container, an electrolyte in said container and in contact with said membrane, and means for electrically contacting said electrolyte.

6. A method of making an electrode which comprises grinding a cationic-exchange material to pass U. S. Sieve Series Number 120, grinding a chemically-inert electrically-insulating moldable plastic binding material to pass U. S. Sieve Series Number 80, mixing the materials together by additional grinding, molding the mixture so as to form at least a part of the wall of a container, placing inside said container and in contact with said molded mixture an electrolyte of desired cationic activity, and immersing an electrical connecting element in said contained electrolyte.

7. A method of making an electrode which comprises grinding a cationic-exchange material to pass U. S. Sieve Series Number 120, grinding a chemically-inert electrically-insulating moldable plastic binding material to pass U. S. Sieve Series Number 80, mixing from 5 per cent to 30 per cent by weight of said ground cationic-exchange material with from 95 per cent to 70 per cent by weight of said ground binding material, molding the mixture so as to form at least a part of the wall of a container, placing inside said container and in contact with said molded mixture an electrolyte of desired cationic activity, and immersing an electrical connecting element in said contained electrolyte.

8. A method of making an electrode which comprises grinding a cation-exchangeable clay to pass U. S. Sieve Series Number 120, grinding a chemically-inert electrically-insulating moldable plastic binding material to pass U. S. Sieve Series Number 80, mixing 10 per cent by weight of said ground cation-exchangeable clay with 90 per cent by weight of said binding material, molding the mixture so as to form at least a part of the wall of a container, placing inside the container and in contact with said molded mixture an electrolyte of desired cationic activity, and immersing an electrical connecting element in said contained electrolyte.

9. A method of making an electrode which comprises grinding a synthetic cationic-exchange material to pass U. S. Sieve Series Number 120, grinding methyl-methacrylate to pass U. S. Sieve Series Number 80, mixing 25 per cent by weight of ground synthetic cationic-exchange material with 75 per cent of the ground methyl-methacrylate, molding the mixture so as to form at least a part of the wall of a container, placing inside said container and in contact with said molded mixture an electrolyte of desired cationic activity, and immersing an electrical connecting element in said contained electrolyte.

10. An electrode comprising a container of inert insulating material, an electrolyte in said container, means for contacting said electrolyte, and a wall membrane comprising 80 per cent to 50 per cent by weight of a finely-divided water-insoluble sulfonated phenolic formaldehyde cation-exchange resin substantially uniformly distributed in and bonded by a remainder of substantially all polystyrene.

11. An electrode which comprises a container molded from the composition comprising 80 per cent to 50 per cent by weight of a finely-divided water-insoluble sulfonated phenolic formaldehyde cation-exchange resin substantially uniformly distributed in and bonded by a remainder of substantially all polystyrene, an electrolyte of desired cationic activity in said container, and means for electrically contacting said electrolyte.

12. A method for making an electrode which comprises molding a composition comprising 80 per cent to 50 per cent by weight of a finely-divided water-insoluble sulfonated phenolic formaldehyde cation-exchange resin substantially uniformly distributed in and bonded by a remainder of substantially all polystyrene, forming a cavity in the molded composition, placing in said cavity an electrolyte of desired cationic activity and immersing an electrical connecting element in said electrolyte.

13. A cation exchanging membrane comprising 80 per cent to 50 per cent by weight of a finely-divided water-insoluble sulfonated phenolic formaldehyde cation-exchange resin substantially uniformly distributed throughout and bonded together with polystyrene which forms substantially the remainder of the composition.

14. A cation exchanging membrane comprising approximately 80 per cent to 50 per cent by weight of finely-divided water-insoluble sulfonated polyhydric phenol formaldehyde cation-exchange resin substantially uniformly distributed throughout and bonded together with polystyrene which forms substantially the remainder of the composition.

15. A cation exchanging membrane comprising approximately 70 per cent by weight of a finely-divided water-insoluble sulfonated phenolic formaldehyde cation-exchange resin uniformly distributed throughout and bonded together with approximately 30 per cent by weight of polystyrene.

HOMER W. PATNODE.
MALCOLM R. J. WYLLIE.

(References on following page)

REFERENCES CITED

The following references are of record in the file of this patent:

UNITED STATES PATENTS

| Number | Name | Date |
|---|---|---|
| 1,990,768 | Youden | Feb. 12, 1938 |
| 2,137,568 | Cserny | Nov. 22, 1938 |
| 2,383,450 | Coleman | Aug. 28, 1945 |
| 2,434,190 | Barnes | Jan. 6, 1948 |
| 2,510,262 | Sollner et al. | June 6, 1950 |

FOREIGN PATENTS

| Number | Country | Date |
|---|---|---|
| 492,936 | Great Britain | Sept. 29, 1938 |
| 523,222 | Great Britain | July 9, 1940 |
| 602,609 | Great Britain | May 31, 1948 |
| 713,093 | Germany | Oct. 9, 1941 |
| 857,912 | France | Oct. 5, 1940 |